United States Patent [19]

Miller et al.

[11] 4,302,409

[45] Nov. 24, 1981

[54] METHOD FOR THE EXTRUSION OF THERMOPLASTIC MATERIAL COMPOSITES

[75] Inventors: John C. Miller, Piscataway; Archibald L. Burnett, Warren; Leonard S. Scarola, Union, all of N.J.

[73] Assignee: Union Carbide Corporation, New York, N.Y.

[21] Appl. No.: 144,049

[22] Filed: Apr. 28, 1980

Related U.S. Application Data

[63] Continuation-in-part of Ser. No. 55,059, Jul. 5, 1979, abandoned, which is a continuation-in-part of Ser. No. 859,923, Dec. 8, 1977, Pat. No. 4,169,679, which is a continuation of Ser. No. 713,121, Aug. 11, 1976, abandoned, which is a continuation-in-part of Ser. No. 610,240, Sep. 4, 1975, abandoned.

[51] Int. Cl.³ .................................................. B29D 27/00
[52] U.S. Cl. .................................. 264/45.9; 264/50; 264/53; 264/171; 264/174; 264/211; 425/4 C; 425/113; 425/817 C
[58] Field of Search ................ 264/50, 51, 53, 54, 264/45.9, DIG. 83, 211, 171, 174; 425/113, 4C, 817 C

[56] References Cited

U.S. PATENT DOCUMENTS 2,848,739  8/1958  Henning .................... 264/45.9 X
3,484,507  12/1969  Smith ......................... 264/40.7
3,711,067  1/1973  Kovacs ....................... 264/53 X
4,033,710  7/1977  Hanning ..................... 264/DIG. 83
4,134,687  1/1979  Eckardt ...................... 264/DIG. 83
4,222,729  9/1980  Ragazzini et al. .......... 264/53 X Primary Examiner—Philip Anderson
Attorney, Agent, or Firm—James C. Arvantes

[57] ABSTRACT

Method for dispersing a fluid additive within only a portion of a stream of thermoplastic material comprising the steps of (a) flowing said stream of thermoplastic material into a channel having walls of substantially circular cross section, into which there has been placed a rotating mixer head having in the surface thereof a plurality of alternate lands and grooves each of said lands and grooves having an upstream end and a downstream end, said lands alternating with said grooves and being arranged in pairs, each of said pairs having a land in loose clearance with said wall followed by a land in close clearance with said wall, said mixer head having an unobstructed internal passage positioned therein over a substantial portion of its terminal length and a plurality of conduits severally connecting elongated zones between said lands pairs and said hollow internal passage, and (b) injecting said fluid additive into said channel at a position between said upstream and downstream ends of said lands and grooves.

9 Claims, 10 Drawing Figures

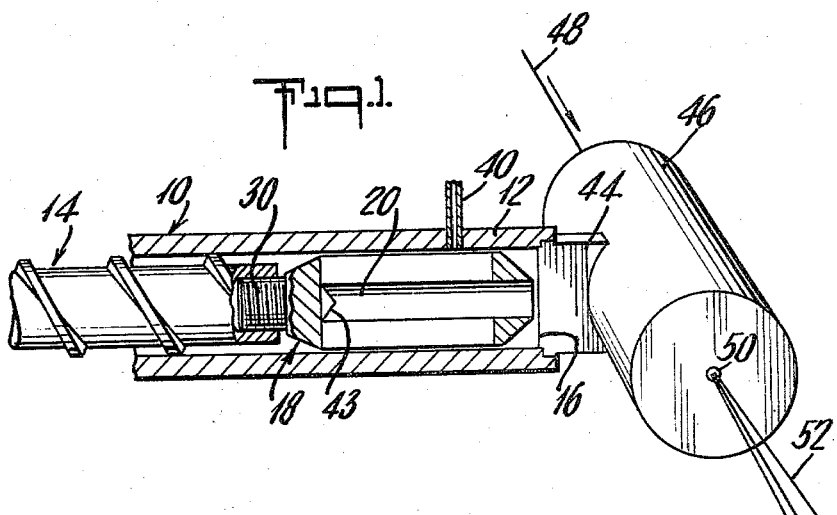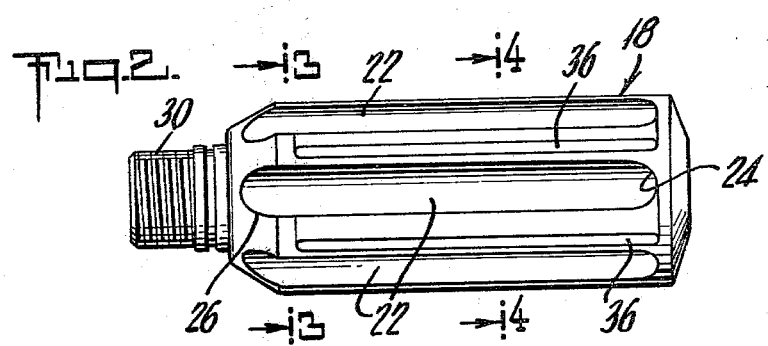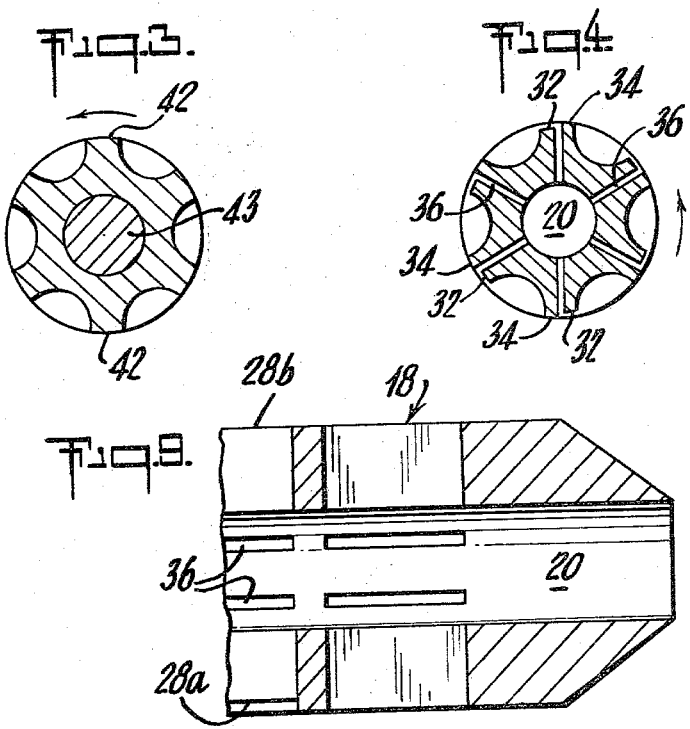

METHOD FOR THE EXTRUSION OF THERMOPLASTIC MATERIAL COMPOSITES

This is a continuation-in-part of our co-pending application Ser. No. 055,059, filed July 5, 1979, now abandoned entitled "Method for the Extrusion of Thermoplastic Material Composites," which is a continuation-in-part of our co-pending application Ser. No. 859,923, filed Dec. 8, 1977, now U.S. Pat. No. 4,169,679 issued Oct. 2, 1979 entitled "Apparatus for the Extrusion of Cellular Thermoplastic Materials" which is, in turn, a continuation of our application Ser. No. 713,121, filed Aug. 11, 1976, entitled "Method and Apparatus for the Extrusion of Cellular Thermoplastic Material," now abandoned; which is a continuation-in-part of application Ser. No. 610,240, filed Sept. 4, 1975, entitled "Extrusion of Cellular Thermoplastic Material," and now abandoned.

The present invention relates to a method for the continuous production of thermoplastic material composites by dispersing a fluid additive within only a portion of a flowing thermoplastic material stream.

Heretofore, many methods have been suggested for the production of thermoplastic material composites. However, no previous method has suggested the continuous production of such composites in a simple single extrusion-type apparatus. Similarly, the prior art has failed to provide or suggest a method in which such a single extrusion-type apparatus, having only a single screw and channel may be employed to continuously produce thermoplastic material composites having two or more component layers forming the composite.

It is, accordingly, the prime object of the present invention to provide a method for the production of thermoplastic material composites having a high level of structural and compositional uniformity.

Another object of the present invention is to provide a method for the production of such composites by processing multiple-component streams to form multi-component layers of such thermoplastic material composites while employing only a single flow passageway while continuously forming such composites and passing the formed stream through a die orifice extrusion zone.

Other aims and advantages of the present invention will be apparent from the following description and appended claims.

It is, of course, to be understood that the term "thermoplastic material," as employed herein, is well known to those skilled in the thermoplastic extrusion art and includes by way of example such resins as polyethylene, polypropylene, polystyrene, polyvinyl chloride and a wide variety of other synthetic organic resinous materials which are accepted as exhibiting thermoplastic properties, together with thermosetting and elastomeric resinous materials which also exhibit such thermal flowable properties. In addition, the resins may contain various chemical and/or physical property modifiers or additives such as are well known to the art.

The term "fluid additive" as used throughout the specification and claims is intended to mean a liquid, a gas, or a solid suspended in liquid and/or gas. The prefered fluid additive is a forming agent, i.e., an expanding or blowing gas, as described more fully below. Dye is another type of fluid additive.

It is to be understood that each of the at least two multiple thermoplastic material component streams may alternatively be either non-expandable or expandable (blown upon the release of pressure following processing in accordance with the invention due to the containment of fluid expanding agent) to form the resulting multi-component composite. Thus, any combination of expanded and unexpanded thermoplastic material component streams may be employed, in accordance with the present invention, to provide the desired resultant composite product stream.

Expanding or blowing gas employed where desired in the method of the invention, should preferable be chemically inert toward and preferably soluble in the base polymer of the expandable composition and would thus include inert gases such as nitrogen, argon, helium, neon and the like.

Other blowing agents may be used. Thus, such blowing agents would include the fluorocarbon type blowing agents.

While the use of nucleating agents is not required in the broadest aspects of the process of the present invention, it has been found preferable to employ nucleating agents.

The nucleating agents which may be used in the compositions of the present invention are materials which provide fine particle sized nucleating sites in the thermoplastic material base polymer during the expansion or blowing thereof, as described below.

The particle size of the nucleating agents should be of the order of about 0.01 to 50 microns. Such material would include polytetrafluoroethylene, azodicarbonamide, p,p'-oxybis(benzene sulfonyl hydrazide), trihydrazino-sym-triazine, and p-toluene sulfonyl semi-carbizide.

The nucleating agents may be used individually or in combination thereof.

The nucleating agents should be dispersed as uniformly as possible throughout the mass of the base polymer.

SUMMARY OF THE INVENTION

A first aspect of the invention comprises a method for dispersing a fluid additive within only a portion of a stream of thermoplastic material comprising the steps of (a) flowing said stream of thermoplastic material into a channel having walls of substantially circular cross section, into which there has been placed a rotating mixer head having in the surface thereof a plurality of alternate lands and grooves each of said lands and grooves having an upstream end and a downstream end, said lands alternating with said grooves and being arranged in pairs, each of said pairs having a land in loose clearance with said wall followed by a land in close clearance with said wall, said mixer head having an unobstructed internal passage positioned therein over a substantial portion of its terminal length and a plurality of conduits severally connecting elongated zones between said land pairs and said hollow internal passage, and (b) injecting said fluid additive into said channel at a position between said upstream and downstream ends of said lands and grooves.

A second aspect of the invention comprises a method for dispersing fluid additive within only a portion of a stream of thermoplastic material comprising the steps of:

(a) flowing said thermoplastic material stream into a channel having walls of substantially circular cross section, into which there has been placed a rotating mixer head having an upstream end and a downstream end and at least two pluralities of alternate lands and grooves arranged at different portions of the mixer head with respect to the direction of flow, each of said lands and grooves having an upstream end and a downstream end and said lands alternating with said grooves and being arranged in pairs, each of said pairs having a land in loose clearance with said wall followed by a land in close clearance with said wall, said mixer heads having an unobstructed internal passage positioned therein over a substantial portion of its terminal length and a plurality of elongated conduits severally connecting elongated zones between said land pairs and said internal passage, said mixer head having separate passages for conveying polymeric material to the upstream ends of said pluralities of alternate lands and grooves, and (b) injecting said fluid additive into said channel where said mixer head is located.

IN THE DRAWINGS

FIG. 1 is a view partially in cross-section of an extruder and wire drawing apparatus suitable for employment in the practice of the method of the invention.

FIG. 2 is an elevational view of the mixer head employed in the embodiment of the invention of FIG. 1.

FIG. 3 is a sectional view taken along the line 3—3 of FIG. 2.

FIG. 4 is a sectional view taken along the line 4—4 of FIG. 2.

FIG. 9 is a cross-sectional view taken along the line 9—9 of FIG. 8.

DETAILED DESCRIPTION OF THE INVENTION

Figure 5:
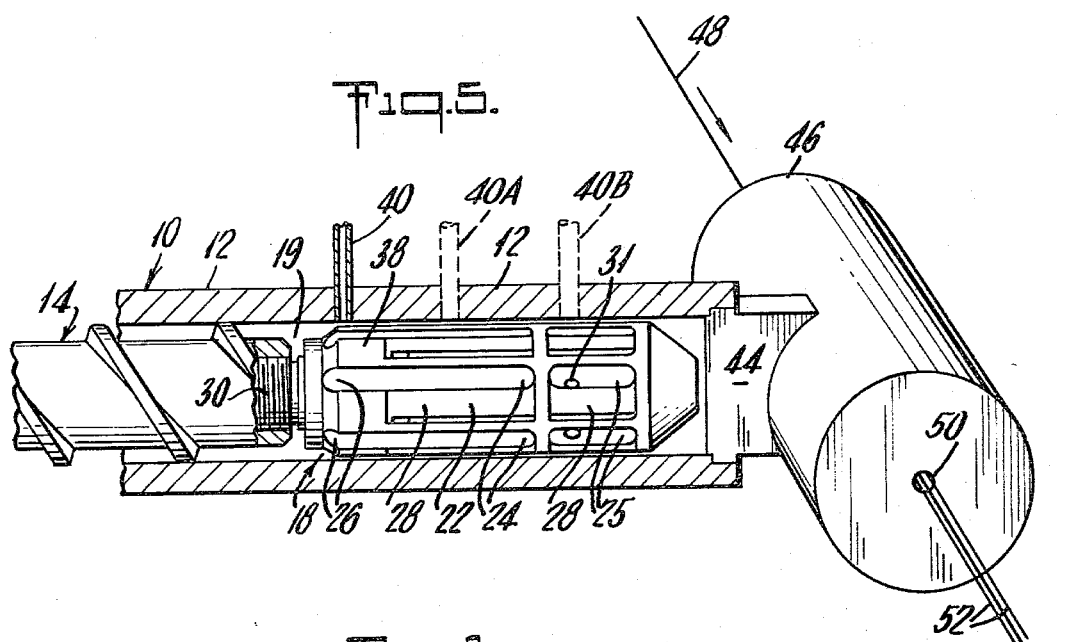
FIG. 5 is a view, partially in cross-section, of extruder and wire drawing apparatus suitable for employment in the practice of the second aspect of the method of the invention.
Figure 6:
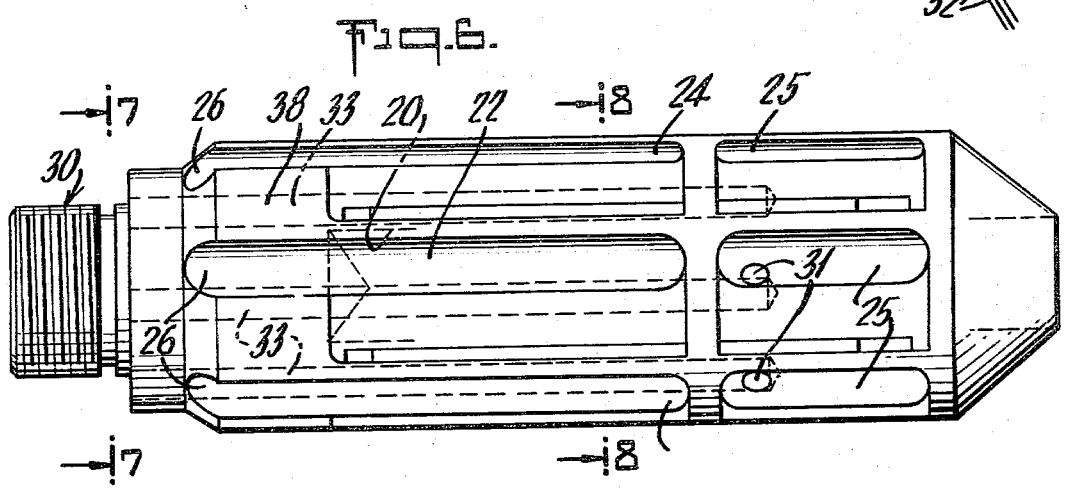
FIG. 6 is an enlarged, elevational view of a composite-forming head means employed in the apparatus of FIG. 5.

Referring specifically to the embodiment of FIGS. 1, 2, 3, and 4 of the drawings, extruder 10 is provided having outer housing 12, containing a channel 19 having circular cross-section, screw means 14 and outlet 16. Mixer head means 18 is positioned on the terminal (downstream) end of screw means 14 and comprises an internal axial passage 20 and a plurality of external longitudinal groove means 22 open on the upstream ends 26 and closed on the downstream ends 24.

Mixer head means 18 is secured to screw means 14 as by screw threads 30.

As thermoplastic material is fed to extruder 10 it passes through the screw section where screw 14 is designed to flux and melt the material before passage to the mixer head means 18. The molten material is divided into a plurality of parallel flow streams which pass into the plurality of longitudinal groove means 22 formed between longitudinal land pairs 32 and 34.

Fluid additive is introduced in the extruder 10 through inlet 40 which is positioned to inject the additive at a position between the upstream and downstream ends of the lands.

The lands comprise land pairs 32 and 34 of different heights, as shown in FIG. 4. As there shown, the leading edge 32 of land pairs are in spaced clearance with the walls of the circular channel followed by lands 34 in close clearance with the walls of the circular channel. A plurality of conduits 36 severally connects elongated zones between the land pairs with hollow internal passage 20.

The apparatus functions as follows. Fluid additive to be dispersed only in the outer shell of the extruded thermoplastic stream is injected through inlet 40 at a position between the upstream and downstream ends of the lands and grooves. A composite of thermoplastic having a core containing no additive, and a shell containing additive is formed because material entering conduits 36 upstream of inlet 40 passes into hollow channel 20 and forms a core having no additive. However thermoplastic material entering conduits 36 downstream of inlet 40 has additive dispersed in it by the action of the mixer head. This dispersion is fully described in U.S. Pat. No. 4,169,679 the entire content of which is incorporated herein by reference. This material containing dispersed additive forms a shell around the core. The shell has fluid additive dispersed in it, but the core contains no fluid additive. Hence, a composite is formed using only one extruder having a single channel.

FIGS. 5 through 9 show an embodiment of the invention having more flexibility than that of FIGS. 1 through 4.

Referring specifically to the embodiment of FIGS. 5 through 9 of the drawings, extruder 10 is provided having outer housing 12, and screw means 14. Cylindrical composite-forming head means 18 is positioned on the terminal (downstream) end of screw means 14 in the extruder housing 12 and comprises an internal axial passage 20, a first circumferential plurality of external longitudinal groove means or flutes 22 open on the upstream ends 26, and closed on the downstream ends 24 and a second separate circumferential plurality of groove means or flutes 25 positioned further downstream of the first plurality 22.

Composite-forming head means 18 is secured to screw means 14 as by screw threads 30.

As thermoplastic material is fed to extruder 10 it passes through the screw section where screw 14 is designed to flux and melt the material before passage to the composite-forming head means 18. A first portion of the molten material is divided into a plurality of parallel flow streams which pass into the plurality of longitudinal groove means 22 formed between longitudinal lands 28 which are each comprised of land pairs 28a 28b.

Although a multiplicity of pluralities of groove means 22 greater than two in number may be employed in apparatus suitable for the practice of the method of the present invention, only two such pluralities are shown in the embodiments of the drawings. The first portion of molten material then flows through conduits 36 from the elongated zone between land pairs 28a and 28b, into channel 20. It should be clear that the flow of the first portion of material in the embodiment shown in FIGS. 5 through 9 is similar to the flow of all of the material that flows in the embodiment of FIGS. 1 to 4.

However the mixer head shown in FIGS. 5 to 9 causes a second portion of molten material to follow a different route. A second portion of molten material enters longitudinal borings 33 at the upstream end of mixer head 18. The second portion then flows through borings 30 and emerges from the borings through radial drillings 31 located at the upstream end of a second plurality of grooves 25. This second plurality of grooves is formed by land pairs in alternate spaced clearance and close clearance with the walls of the extruder, the same as upstream land pairs 28a and 28b. A second plurality of conduits, similar to conduits 36, conducts the second portion of molten material into channel 20.

In summary, the molten material is split into two portions which follow different routes to channel 20.

The first portion flows into grooves 22, through conduits 36, into channel 20.

The second portion flows through longitudinal borings 30, through radial drillings 31, into grooves 25. From grooves 25 the second portion flows through conduits similar to 36 into channel 20.

Fluid additive, for example, a gaseous blowing or expanding agent may be introduced into the extruder 10 through inlet 40 which is positioned to inject the gas into the groove means 22 of first plurality of composite-forming head means 18 near the upstream ends thereof. This will mix additive with the first portion of molten material as follows. The lands in this region 38 are in close clearance with the inner walls of the extruder barrel. The rotation of the screw means 14 and connected head 18 causes the lands to constantly sweep the gaseous blowing agent inlet port and intermittently open and close passage of gas under substantially full inlet pressures to the parallel molten material streams passing through the plurality of groove means 22.

Figures 7, 8:
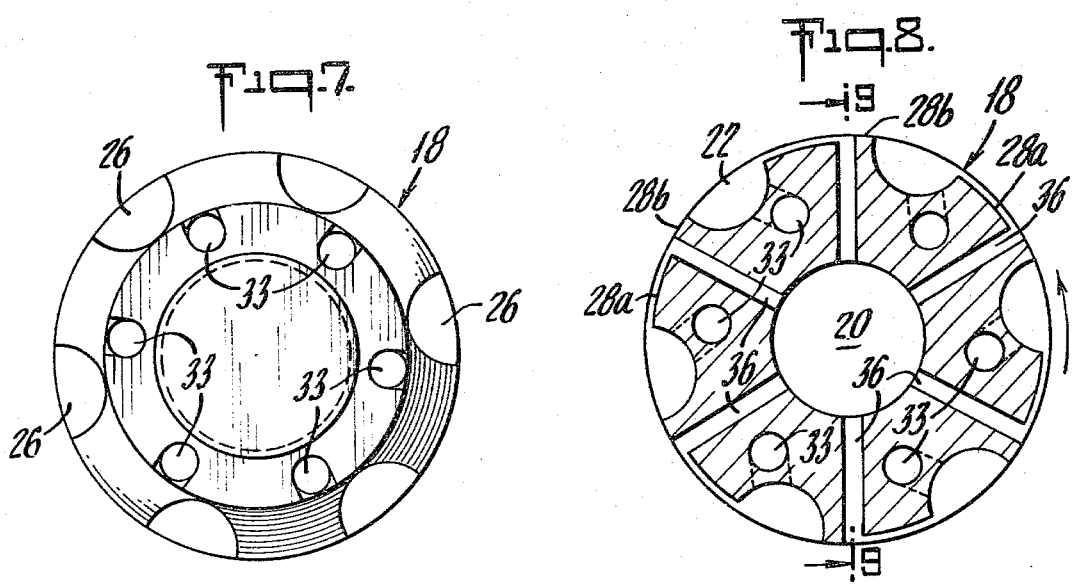
FIG. 7 is a sectional view taken along the line 7—7 of FIG. 6.
FIG. 8 is a sectional view taken along the line 8—8 in FIG. 6.

The lands of the first plurality, downstream of the region 38, comprise land pairs 28a and 28b of different heights, as shown in FIG. 8. As there shown, the leading edge 28a of land pairs are in spaced clearance with the walls of the extruder barrel to provide therebetween regions of high shear mixing as the material and gas pass from the plurality of grooves over these edges to radial conduits or slots 36 to the internal axial passage 20. The streams of mixed or dissolved gas and molten thermoplastic material are there joined in passage 20 and form a confluent stream filling the entire cross-section and advancing downstream through internal passage 20 of head means 18.

The gas and molten material in the plurality of grooves 22 are there mixed by a circular, swirling action caused by rotation and passage along the internal walls of the extruder housing. This action also prevents clogging of material in the mixing grooves.

The close clearance of the trailing portion of the land pairs 28b causes a cleaning action along the internal walls of the extruder barrel.

The second portion of molten material flowing through borings 30 and drillings 31 has no fluid additive dispersed in it. It enters channel 20 near channel 20's downstream end, thereby forming an outer shell of material having no additive over a core of material containing additive. This is just the opposite of the product formed with the embodiment shown in FIGS. 1 to 4, which produces material having a core with no additive and a shell containing additive.

A preferred application of this invention is to coat wire or cable with the composite material formed. This can be accomplished as follows: The molten material when discharging from extruder 10 passes through chamber 44 to die head 46. An electrical conductor 48, which is to be coated with the composite material is fed to the die head at speeds of from about 20 to 10,000 feet per minute. A uniform coating of molten extrudate composite is continuously applied to the conductor as it passes through the die head 46. The thickness of the coating is determined by the orifice in die 50 which is located in the side of die head 46, and through which the conductor emerges from the die head bearing coating 52. If a foaming agent has been used as the fluid additive, the thermoplastic material expands due to pressure release after it passes through the die to form the desired cellular layer of the composite coating.

If fluid additive is added to the apparatus shown in FIG. 5 through inlet 40A, instead of 40, then only a part of the first portion of molten material will have fluid additive dispersed in it. The resulting composite will have a layer of material into which additive is dispersed disposed between a core and shell containing no additive.

If the additive is added through inlet 40B (FIG. 5), then the resulting composite will have a core that contains no additive and a shell having additive dispersed in it.

Figure 10:
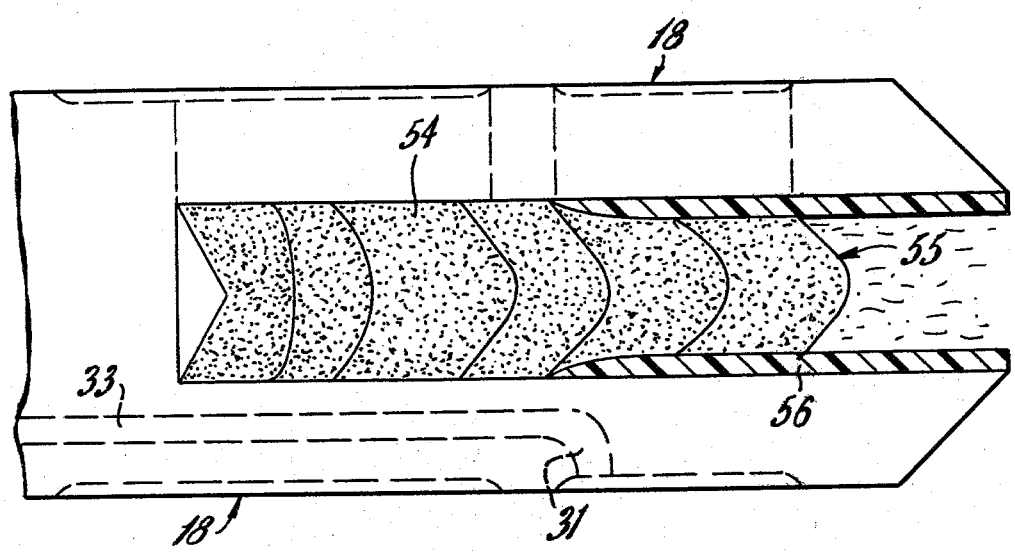
FIG. 10 is a cross-sectional view of composite material being formed within the mixer head shown in FIG. 5.

FIG. 10 shows how a composite forms when using the apparatus of FIG. 5, if additive inlet 40 is used. The first portion of material, into which additive has been dispersed, is represented by numeral 54. Velocity profiles are shown drawn in the flowing material as represented, for example, by numeral 55. The second portion of material which forms a shell into which no additive is dispersed is represented by numeral 56.

It has been discovered that the material will remain in its composite form when the composite is extruded through non-mixing dies of various shapes. For example, composites have been made by the method of the present invention having circular elongated rectangular and eliptical shapes.

Of course the composite may be passed through dies of any desired shape to form products having, for example, circular, elliptical, square, rectangular, or any other desired cross-section.

In order to obtain the desired split between the first portion of molten material that enters groove 22 and the second portion that enters longitudinal borings 30, flow obstructions may be placed at the upstream end of either element 22 or 30 to limit the amount of flow into one element while increasing the amount of flow to the other.

EXAMPLES

In examples of the process of the present invention, experiments were conducted on a 2.5 inch, 30/1 extruder to determine if the mixing head illustrated by FIGS. 1 to 4 would produce a skin-foam laminate composite coating on an extruded rod. Two diameter dies were used, 0.125 inches and 0.5 inches in these experiments. The results did indeed produce rods covered by a composite having a core in which no fluid additive was dispersed and a shell in which there was dispersed fluid additive. Surprisingly the shell was quite evenly distributed around the core.

In another set of experiments, the apparatus illustrated in FIGS. 5 to 9 was used as set forth in the following table:

TABLE 2.5 Inch Extruder
Material: 0.6 MI Polyethylene

|  | Trial No. 1<br>0.125" Capillary | Trial No. 2<br>0.5" Capillary |
|---|---|---|
| RPM: | 20 | 36 |
| Output: | 30 pounds/hour | 46 pounds/hour |
| Sonic Gas Metering Valve: Upstream/Downstream | 4500/1000 psi | 3500/1000 psi |
| Barrel Temperature: | 150° C. | 150° C. |

DATA ON FLAT SHEET COMPOSITE EXTRUSION (Employing same extruder and material as in Table above)

Trial No. 3: Sheet Die
RPM: 10
Output: 13 pounds per hour
Valve: 0.85 mils—capillary
Pressure across the valve: 2000/1000 psi
Result: Composite sheet (skin/foam/skin) produced with large bubbles in the middle of the sheet (0.5 inch diameter bubbles).

Trial No. 4:
RPM: 10
Output: 13 pounds per hour
Valve: 0.45 mils—capillary
Pressure across the valve: 2100/1000 psi
Result: Composite sheet formed without large bubbles in the middle of the sheet.

Some applications of this invention are:

A. Foam/solid composites

1. Foam-skin telephone singles—it may be possible to produce an insulation for telephone singles having a solid outside and foam inside. This is already being done commercially, but requires two extruders and two resins. This new method would eliminate the need for one resin and one extruder, and perhaps simplify the operation.

2. CATV-cables—Using a composite, it is possible to produce CATV insulation with a thin solid inner layer, thereby improving adhesion to the center conductor, a major problem encountered in foam CATV cables.

3. Tubing and Pipe—By using the composites forming method, pipe can be produced having a smooth inner surface for good flow characteristics, and a foam outer layer for thermal insulation and mass reduction.

4. Grocery Bags—Grocery bags produced from a solid composite would be stiffer for a given bag weight and have superior "stand up" characteristics.

5. Blown Film—a thin solid layer on a foam film would provide better containment of the air bubble employed in blown film producing processes, and may also permit the production of thinner films due to increased melt strength.

6. Printability—A foam/solid composite film is now employed for protecting glass bottles. The foam of a composite produced by the method of the invention provides the protection, while the solid layer is needed for printability.

B. Slot cast operations

The method of producing composite structures discussed herein is also applicable to slot cast operations such as sheeting or extrusion coating. This application would be limited to the symmetrical (A/B/A) type of composites.

C. Non-polymer fluids

It is also believed that the method of the invention can be employed to make non-polymer composites, or polymer/non-polymer composites.

What is claimed is:

1. Method of producing a thermoplastic composite by dispersing a fluid additive within only a portion of a stream of thermoplastic material comprising the initial steps of (a) flowing said stream of thermoplastic material into a channel having walls of substantially circular cross section, into which there has been placed a rotating mixer head having in the surface thereof a plurality of alternate lands and grooves each of said lands and grooves having an upstream end and a downstream end, said lands alternating with said grooves and being arranged in pairs, each of said pairs having a land in loose clearance with said wall followed by a land in close clearance with said wall, said mixer head having an unobstructed internal passage positioned therein over a substantial portion of its terminal length and a plurality of conduits severally connecting elongated zones between said land pairs and said hollow internal passage, and (b) injecting said fluid additive into said channel at a position between said upstream and downstream ends of said lands and grooves with the result that within the mixer head the core of the composite contains no fluid additive and the shell about the core has fluid additive dispersed therein.

2. The process of claim 1 wherein said fluid additive is a foaming agent.

3. The process of claim 1 wherein said fluid additive is a dye.

4. Method of producing a thermoplastic composite by dispersing fluid additive within only a portion of a stream of thermoplastic comprising the initial steps of:

(a) flowing said thermoplastic material into a channel having walls of substantially circular cross section, into which there has been placed a rotating mixer head having an upstream end and a downstream end and at least two pluralities of alternate lands and grooves arranged at different portions of the mixer head with respect to the direction of flow, each of said lands and grooves having an upstream end and a downstream end and said lands alternating with said grooves and being arranged in pairs, each of said pairs having a land in loose clearance with said wall followed by a land in close clearance with said wall, said mixer head having an unobstructed internal passage positioned therein over a substantial portion of its terminal length and a plurality of elongated conduits severally connecting elongated zones between said land pairs and said internal passage, said mixer head having separate passages for conveying polymeric material to the upstream ends of said pluralities of alternate lands and grooves, and (b) injecting said fluid additive into said channel where said mixer head is located with the result that within the mixer head, depending upon the point of injection of the fluid additive, the core of the composite contains no fluid additive and the shell about the core has fluid additive dispersed in it or the core of the composite contains fluid additive and the shell about the core contains no fluid additive or the composite has a layer, into which additive is dispersed, disposed between the core and the shell which contain no additive.

5. A method of producing a composite as defined in claim 4 wherein an additive is injected at the upstream end of a mixer head having a plurality of alternate lands and grooves at the upstream and downstream ends of said mixer head as defined in claim 4, with the result that additive is dispersed in the core but not in the shell about said core.

6. A method of producing a composite as defined in claim 4 wherein an additive is injected at a point between the upstream and downstream end of upstream lands and grooves of a mixer head having a plurality of alternate lands and grooves at the upstream and downstream ends of said mixer head, as defined in claim 4, with the result that the composite has a layer, into which additive is dispersed, disposed between the core and shell which contain no additive.

7. A method of producing a composite as defined in claim 4 wherein additive is injected at the downstream end of a mixer head having a plurality of alternate lands and grooves at the upstream and downstream ends of said mixer head, as defined in claim 4, with the result that additive is dispersed in the shell about the core but not in the core.

8. The method of claims 4, 5, 6 or 7 wherein the fluid additive is a foaming agent.

9. The method of claims 4, 5, 6 or 7 wherein the fluid additive is dye.

* * * * *